J. H. WALKER.
TROLLEY POLE CATCHER.
APPLICATION FILED DEC. 4, 1908.

941,216.

Patented Nov. 23, 1909.
2 SHEETS—SHEET 1.

WITNESSES
Samuel E. Wade
Perry B. Turpin

INVENTOR
JOHN H. WALKER
BY Munn & Co.
ATTORNEYS

J. H. WALKER.
TROLLEY POLE CATCHER.
APPLICATION FILED DEC. 4, 1908.
941,216.
Patented Nov. 23, 1909.
2 SHEETS—SHEET 2.
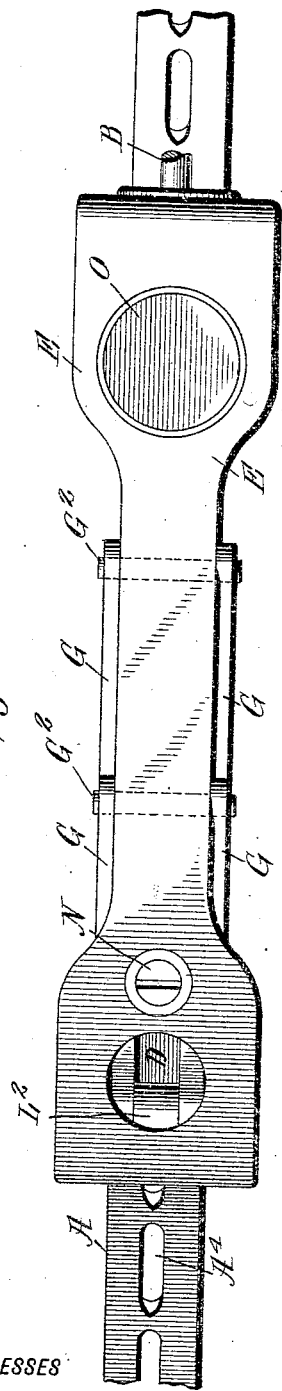
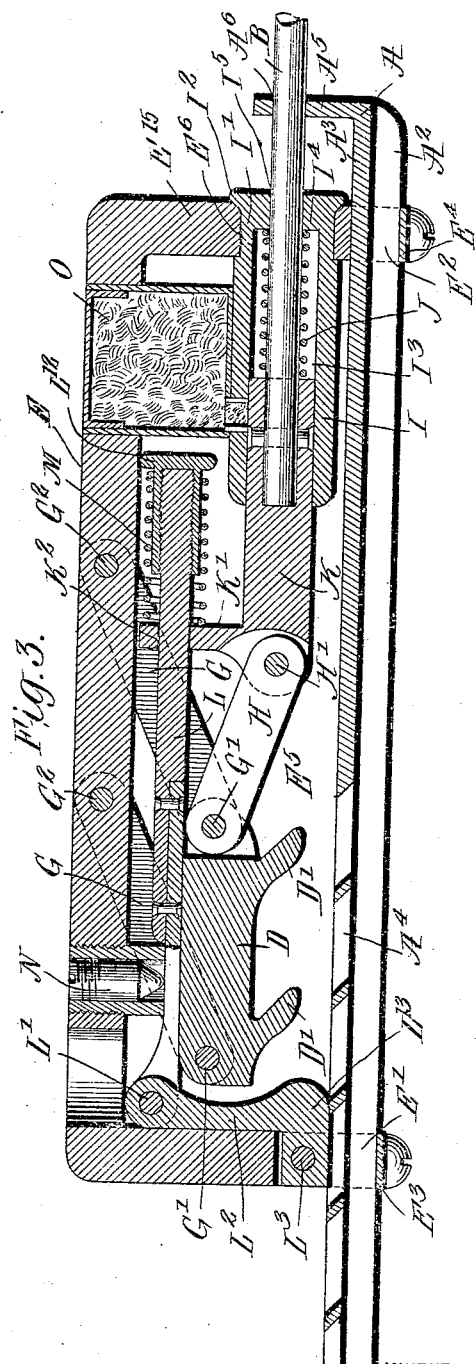
WITNESSES
Samuel E. Wade.
Perry B. Turpin.
INVENTOR
JOHN H. WALKER
BY Munn & Co.
ATTORNEYS

UNITED STATES PATENT OFFICE.

JOHN H. WALKER, OF LEXINGTON, KENTUCKY.

TROLLEY-POLE CATCHER.

941,216.  Specification of Letters Patent.   Patented Nov. 23, 1909.

Application filed December 4, 1908. Serial No. 465,946.

*To all whom it may concern:*

Be it known that I, JOHN H. WALKER, a citizen of the United States, and a resident of Lexington, in the county of Fayette and State of Kentucky, have made certain new and useful Improvements in Trolley-Pole Catchers, of which the following is a specification.

This invention is an improvement in trolley pole catchers and has for an object to provide a novel construction in connection with the trolley pole and a lower connection, whereby the trolley pole may be prevented from rising to a perpendicular position when the trolley wheel jumps the wire, and whereby the said trolley pole may be held in any desired intermediate position and may be permitted to freely move in contact with the wire as desired in the operation of devices of this character; and the invention consists in certain novel constructions and combinations of parts as will be hereinafter described and claimed.

Figure 1:
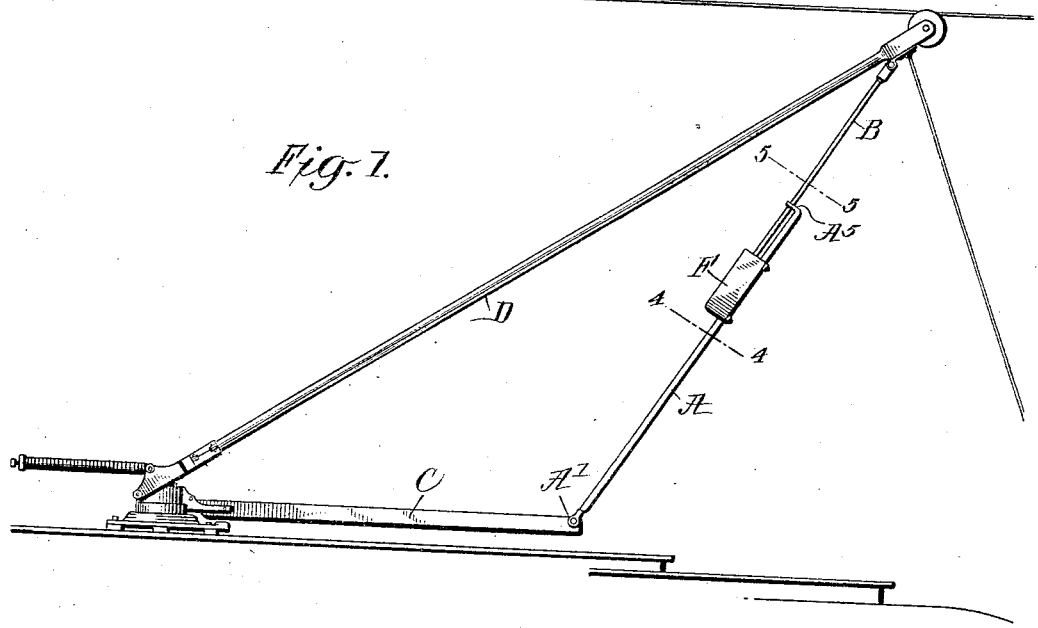
Figure 4:
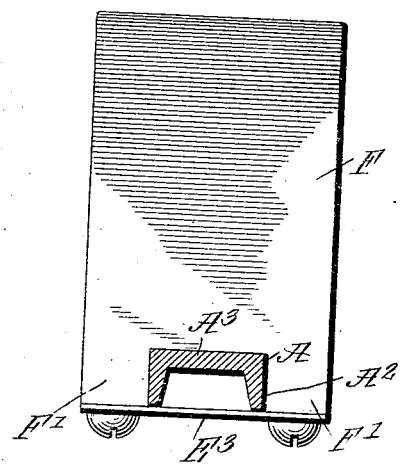
Figure 5:
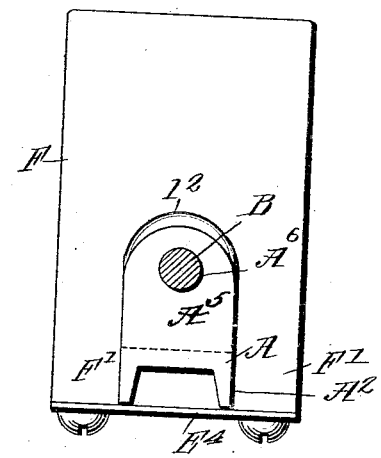

In the drawings—Figure 1 is a side elevation of my device as in use, the cover for the sliding carrier being applied. Fig. 2 is a top plan view of the sliding carrier and a portion of the rack, the cover being removed. Fig. 3 is a vertical longitudinal section of the carrier. Fig. 4 is a cross section on about line 4—4 of Fig. 1 drawn in rear or below the carrier. Fig. 5 is a cross section on about line 5—5 of Fig. 1 drawn above the carrier.

The present invention relates in a manner to the inventions disclosed in certain prior patents granted to me, said patents being numbered 787,810, dated April 18, 1905, No. 852,307, dated April 30, 1907, and No. 899,578, dated Sept. 29, 1908. The said prior patents, however, while they show a sliding carrier having dogging devices operating upon a rack, the said carrier devices and rack are arranged to operate parallel with the top of the car and the carrier connects through a rod with the swinging trolley pole.

My present invention differs from my prior patents in the location of the sliding carrier as well as in certain features of construction of the rack and dogging devices as will more fully appear hereinafter.

In the present construction, as best shown in Fig. 1, I arrange the rack and the sliding carrier between the top of the car and the trolley pole and preferably make the rack A constitute one of two sections A and B of the connection between the top of the car and the trolley pole, whereby the movements of the latter are controlled. In this construction the dogging devices constitute the means for controlling the sliding movements of the said sections A and B in extending the length of the connections between the top of the car and the trolley pole.

The rack A is pivoted at its lower end at A' to a bar C extending from the turn table to which the trolley pole D is pivoted at its lower end. This rack A is preferably of channel metal with its depending side plates $A^2$ and a top plate $A^3$, the latter being provided at intervals with openings $A^4$ forming seats for engagement by the teeth D' of the swinging dog D presently described. At its upper end the rack A is provided with an upturned lug $A^5$ perforated at $A^6$ to form a guide for the rod B as best shown in Fig. 3 of the drawings.

The rod B as before described connects at its upper end with the upper end of the trolley pole and it is manifest that by varying the length of the connection comprising the sections A and B, the height of the trolley pole may be controlled.

The carrier comprises a frame E and a casing F fitting over the same, the casing forming a housing or cover for protecting the working parts and also aiding in maintaining the carrier frame E upon the rack A, the casing extending over the frame E and having depending portions or legs F' extending down along the opposite sides of the rack A, as shown in Figs. 1, 4 and 5 of the drawings. The frame E is slidable along the rack A and has at its lower and upper ends depending portions E' and $E^2$ connected by cross bars $E^3$ and $E^4$ extending below the rack to secure the frame E slidably thereon. This carrier frame E is made hollow or chambered at $E^5$ to receive the dogging devices which operate as detent means to prevent the sliding movement of the frame E upon the rack under certain conditions.

As shown, the dogging devices include a swinging toothed dog D, whose teeth D' swing into and out of engagement with the seats $A^4$ of the rack and are carried by links G which are pivoted at their lower ends G' to the dog D and at their upper ends at $G^2$ to the frame E so the dog D may operate after the fashion of a parallel ruler in swinging into and out of engagement with the rack. This dog is connected at its upper end by a link H with the lower end of the rod section B by intermediate devices presently described, so that a sudden pull on the rod B, such as occurs when the trolley wheel slips off the wire, will pull the dog D into engagement with the rack by swinging the same on its link connection toward the said rack and into engagement therewith. Normally, the swinging dog D is spring-actuated to a position out of engagement with the rack and held in said position by the actuating spring or springs, and a brake is applied as more fully described hereinafter.

In the construction shown the upper end plate E¹⁵ of the frame E has an opening E⁶ in which is held the tenoned upper end I' of a guide plug I, the said tenoned end being preferably held by swaging the end I² of the tenon I' in rivet form at the outer face of the plate E⁵ as best shown in Fig. 3 of the drawing. This guide plug I has a longitudinal bore I³ open at its lower end and partially closed at its upper end by an integral part I⁴, having an opening I⁵ for the rod B and forming at its inner side a shoulder abutment or bearing for the upper end of the spring J. The lower end of the bore I³ is open permitting the sliding movement of the bracket K, to which the upper end of the link H is pivoted at H', said link being pivoted at its lower end at G' in connection with the dog D.

The spring J bears between the bracket K and the upper end wall of the guide plug I and the said bracket K has a projecting arm K' perforated at K² for the passage of a brake rod L, which is pivoted at its lower end at L' to the brake shoe L², which latter is pivoted at L³ to the carrier frame and has a shoe or portion L¹³ which is pressed into engagement with the rack by upward draft or tension on the brake bar L when a sudden draft or pull is exerted upwardly on the rod B. The brake bar L extends over the dog D and projects through the opening K² and receives above the arm K' of the bracket, a spring M bearing between the said bracket and an adjustable shoulder L¹², preferably in the form of a nut screwed on the brake rod as shown.

A set screw N operates above the brake rod L and the bracket K sliding in the guide plug I is lubricated from a cup O which may be supplied with lubricant in any suitable manner.

By the described construction it will be noticed the dog D will be held normally in the position shown in Fig. 3 by the spring devices and will be held in such position during the movement of the trolley pole up and down under the control of the operator in setting the wheel to and from the wire and will also remain in such position during the gradual movements of the trolley pole up and down in the adjustment of the wheel to the wire under different degrees of tension in the latter. If, however, the trolley wheel escapes from the wire and the pole moves suddenly upward, the spring devices controlling the dog will be overcome and the dog will be forced into engagement with the rack, stopping the trolley pole and preventing any injurious upward movement of the same.

As best shown in Fig. 2, the carrier frame has a narrow intermediate portion and wider end portions, the latter straddling the rack bar. The narrow intermediate portion permits me to pivot the parallel links G carrying the dog D alongside the carrier frame and near the top thereof, thus permitting the use of longer links than would be practicable except for this construction.

Manifestly in carrying out my invention the different parts may be made of suitable metals or materials and care should be taken in constructing and connecting the different parts in order to secure the accurate operation thereof in the manner before described.

In the operation of my invention it will be noticed that the action is positive and the dogging devices will prevent the trolley pole and the wheel from rising at any time to a detrimental height above the trolley and span wires when the trolley pole accidentally leaves the wire. The construction is such that it also facilitates the application of the trolley wheel to the wire and the trolley pole will be caught at any angle either above or below the trolley wire quickly at any time that may be desired, thereby facilitating the finding of the wire and the adjustment of the wheel thereto in dark places. The invention will also be found useful in maintaining the trolley pole in the desired position in turning at the end of a run. It will also be noticed that the trolley wheel can be caught positively at six or eight inches above the supposed level of the trolley wire, thus forming a trolley wire finder when the pole is turned around and strikes the wire at the opposite end of the car, when the trolley can be quickly adjusted for the next run. Furthermore, the important feature of my invention is the positive dogging construction provided, which by the aid of two small spiral springs enables the carrier or traveler to move upward along the rack bar without engaging therewith and when a sudden upward movement of the trolley pole occurs, in case the wheel leaves the wire, the spring M will impart a gradual pressure on the brake devices, causing the brake shoe to bind with enough friction to cause both spiral springs to compress, thereby lowering the dog into engagement with the rack and suddenly stopping the upward movement of the trolley pole and wheel.

When the trolley pole is drawn down the dog quickly moves out of engagement with the rack by the action of the spring devices before described.

By my invention it will be noticed the sliding carrier instead of operating parallel with the top of the car is arranged and operates approximately parallel with the trolley pole.

The screw N operates as a set screw to gage the distance of the lower points of the teeth of the dogging pawl bar from the upper surface of the channel rack in order to overcome lost motion and to cause the teeth to engage with the rack as quickly as possible when the trolley wheel leaves the wire.

I claim—

1. The combination of a turn table, a bar extending therefrom approximately parallel with the top of the car, a trolley pole pivoted to the turn table, a connection between the said bar and trolley pole and composed of a rack section and a rod section, a carrier frame sliding along the rack section and having a sliding connection with the rod, a spring controlling said sliding connection, a dog in the carrier frame and movable into and out of engagement with the rack, a link connection between the said dog and the rod, parallel links pivoted at one end to the dog and at their other ends to the carrier frame, a brake pivoted to the carrier frame and intermediate devices between the brake and the rod, substantially as set forth.

2. In a trolley pole catcher, the combination of a rack bar, a rod movable longitudinally parallel with the rack bar, a carrier frame slidable along the rack bar and a dog carried by the said frame and connected with the rod and movable thereby into engagement with the rack bar, and means resisting such movement under normal conditions, substantially as set forth.

3. The combination in a trolley pole catcher, of a rack, a carrier frame slidable along the rack, a dog in the carrier frame and parallel links connecting the dog with the carrier frame and pivoted to both said parts whereby to operate substantially as described, and a rod connected with the swinging dog, substantially as set forth.

4. The combination with the rack, of a carrier frame slidable along the same, a dog in the carrier frame and movable into and out of engagement with the rack, a brake lever in the carrier frame, a brake rod connected with the dog and having a limited sliding movement in the carrier frame, a spring resisting said movement, and a spring interposed between the brake rod and the said sliding rod, substantially as set forth.

5. The combination with a rack bar and a carrier frame sliding along the same, of a dog carried by said frame and movable into and out of engagement with the rack, a pivoted brake lever having a shoe or portion movable into engagement with the rack, means for operating the dog, and a yielding connection between said dog operating means and the brake lever, substantially as set forth.

6. The combination in a trolley pole catcher, of a rack, a carrier frame slidable along the rack, a dog in the frame and movable into and out of engagement with the rack, a pivoted brake lever having a shoe movable into and out of engagement with the rack and also provided with an upwardly projecting arm, a slide rod having a limited sliding movement in the carrier frame and provided with a projecting bracket arm, a link connecting said rod with the dog, a brake rod connected with the upwardly extending arm of the brake lever and extending thence through the arm of the slide rod bracket, a spring bearing between said bracket arm and the brake rod, and a spring acting between the slide rod and the carrier frame, substantially as set forth.

7. The combination of a trolley pole pivoted at its lower end, a connection comprising two sections, one of which is pivoted at its upper end to the trolley pole, said sections being slidable longitudinally relative to each other, a brake operating between said sections, dogging devices between the said sections, and means whereby said brake and dogging devices may be brought into operation by a quick movement of the sections relatively to each other, substantially as set forth.

8. In a trolley pole catcher, the combination with a rack and a carrier frame slidable thereon, of a dog carried by the said frame and movable bodily into and out of engagement with the rack, means for operating the dog, and a brake also operated by said means substantially as set forth.

9. The combination in a trolley pole catcher with a rack, and a carrier frame movable along the same, of a dog in the carrier frame, and links connecting the said dog with the frame whereby the dog may move bodily into and out of engagement with the rack, substantially as set forth.

10. The combination with a rack and a carrier frame, of a dog in the carrier frame, links connecting the dog with the carrier frame, whereby the dog may move bodily into and out of engagement with the rack, a rod slidable in the carrier frame, a spring resisting such sliding movement of the rod, and connections between the rod and dog, whereby the latter may operate the dog into engagement with the rack by a quick movement of the rod, substantially as set forth.

11. The combination of a rack, a carrier frame slidable thereon, a dog in the carrier frame and movable into and out of engagement with the rack, a guide plug held in the carrier frame and having an upper end plate perforated for the passage of a slide rod and also having a longitudinal bore extending from the said end plate to the lower end of the plug, a slide rod movable in said opening of the end plate of the plug, a bracket operating in the bore of the plug and connected with the slide rod, said bracket having a projecting arm perforated for the passage of a brake rod, a spring bearing between the said bracket and the end plate of the plug, connections between the bracket and the dog, a brake, a rod connected with the brake and extending through the opening of the bracket arm, and a spring operating upon the brake rod, substantially as described.

12. The combination of a rack bar, a carrier frame having an intermediate narrowed portion and wider end portions straddling the rack, a dog below the narrow portion of the frame, and links pivoted at their lower ends to the dog and at their upper ends alongside the narrow portion of the frame, and means for operating the dog, substantially as set forth.

13. In a trolley pole catcher the combination of a rack, a carrier frame sliding thereon, a dog in the carrier frame and movable bodily into and out of engagement with the rack, means for operating the dog into engagement with the rack, a brake carried by the carrier frame, and intermediate devices between the said brake and the dog operating means, substantially as set forth.

14. The combination of the rack provided at its upper end with a lug or arm perforated for a slide rod, a carrier frame movable along the rack, a dog in the carrier frame and movable into and out of engagement with the rack, yielding devices whereby to hold said dog normally away from the rack, and a slide rod movable longitudinally through the arm or lug of the rack and connected with the dog, substantially as set forth.

15. The combination of a rack bar, a carrier frame sliding thereon, a dog in the carrier frame and swinging into and out of engagement with the rack, a brake carried by the carrier frame, a brake rod connected with said brake and extending over the swinging dog and devices for operating the dog, substantially as set forth.

16. In a trolley pole catcher a carrier frame, a bar along which said frame is supported to slide, a dog in the carrier frame and movable into and out of engagement with the bar, a brake in the carrier frame and movable into and out of engagement with the bar, and intermediate devices between the brake and dog.

17. The combination with a carrier frame and a bar along which said frame is mounted to slide, of a dog carried by the frame and movable into and out of engagement with the bar, and a brake also carried by the frame and movable into and out of engagement with the bar, substantially as set forth.

18. The combination with the trolley pole, of a connection between the top of the car and said pole and comprising two sections slidable relatively, and dogging devices controlling such sliding movement, an intermediate brake device between said sections, and means for operating said brake and dogging devices substantially as set forth.

JOHN H. WALKER.

Witnesses:
GEORGE W. VAUGHN,
LENA MOHR.